(12) United States Patent
Tsai

(10) Patent No.: US 8,643,712 B2
(45) Date of Patent: Feb. 4, 2014

(54) IMAGE CAPTURING DEVICE WITH WATERPROOFING

(75) Inventor: Yi-Yuan Tsai, Hemei Township (TW)

(73) Assignee: Altek Corporation, Hsinchu (TW)

( * ) Notice: Subject to any disclaimer, the term of this patent is extended or adjusted under 35 U.S.C. 154(b) by 317 days.

(21) Appl. No.: 13/155,893

(22) Filed: Jun. 8, 2011

(65) Prior Publication Data

US 2012/0169865 A1 Jul. 5, 2012

(30) Foreign Application Priority Data

Dec. 31, 2010 (TW) .............................. 99147401 A

(51) Int. Cl.
*G03B 17/08* (2006.01)

(52) U.S. Cl.
USPC .................................. 348/81; 396/26; 396/25

(58) Field of Classification Search
USPC .......................................... 348/81; 396/25–26
See application file for complete search history.

(56) References Cited

U.S. PATENT DOCUMENTS

| 4,763,145 A | * | 8/1988 | Takamura et al. ............... 396/26 |
| 2006/0177362 A1 | * | 8/2006 | D'Evelyn et al. ........... 422/245.1 |
| 2012/0189289 A1 | * | 7/2012 | Ghali et al. ..................... 396/27 |

* cited by examiner

*Primary Examiner* — Christopher S Kelley
*Assistant Examiner* — Matthew Kwan
(74) *Attorney, Agent, or Firm* — Wang Law Firm, Inc.; Li K. Wang; Stephen Hsu

(57) ABSTRACT

An image capturing device with waterproofing, comprising a main body, a first sensing unit, and a pressure control module. The main body has a containing space for containing an electronic component set. The first sensing unit is disposed at the outside of the main body and used for sensing the pressure where the main body is located to obtain a first pressure value. The pressure control module is disposed in the containing space of the main body and electrically connected to the first sensing unit. By using a second pressure sensing unit to sense the pressure of the containing space, the pressure control module obtains a second pressure value and compares the relative deviation of the first pressure value and the second pressure value through a processing unit to adjust the inner pressure of the image capturing devices.

10 Claims, 5 Drawing Sheets

IMAGE CAPTURING DEVICE WITH WATERPROOFING

FIELD OF THE INVENTION

The exemplary embodiment(s) of the present invention relates to an image capturing device with waterproofing. More specifically, the exemplary embodiment(s) of the present invention relates to an image capturing device which enables the control of interior pressure of such device in order to prevent water from permeating into.

BACKGROUND OF THE INVENTION

As people change the way to record their living style, they start paying attention to art development, and with the continuous improvement of the technology, digital camera has become a necessary electronic product for everyone. When traveling, eating delicious food, snorkeling or swimming, people carry the digital cameras all the time to capture and record every beautiful moment. Currently there are waterproof cameras in the market for taking pictures in the water, however, it is not sufficient to resist high water pressure and prevent water from permeating inside of the camera to break the electronic components.

The present waterproof function of the digital camera is achieved by two ways. One is to seal the digital camera by a completely sealed containing box or a sealing bag to prevent liquid from permeating the inside. Another is to place elasticity air tightness materials on the connecting areas between each case when assembling the cases of the digital camera. By pressing the elasticity air tightness materials on the cases, the cases of the digital camera is sealed to prevent foreign body from going inside or to prevent liquid from permeating the inside of the digital camera cases to break down the relative electronic components. However, these two waterproof mechanisms are limited by the property and life of the sealing materials. Therefore, when using these kinds of waterproof cameras under high water pressure for a long time, the sealing bag is easily broken or the elastic fatigue occurs easily on the sealed materials due to the large pressure difference between interior and exterior of the camera. Hence the liquid such as water will permeate the inside the case of the camera and break the camera.

Thus, with the assumption that the camera case can be sealed, designing an interior pressure adjustable image capturing device to reduce the impact of pressure difference on the sealed materials of the camera and provide an image capturing device with waterproofing resisting high pressure has been an emerging issue in the market.

SUMMARY

A primary object of the present invention is to provide an image capturing device with waterproofing. It helps save the problem that the sealing bag is easily broken or the elastic fatigue occurs easily which causes liquids like water flows into the case of the camera to break the camera because the pressure deviation between the interior and the exterior of the camera is too large.

According to an object of the present invention, an image capturing device with waterproofing is disclosed, comprising an adjustable main body, a first sensing unit and a pressure control module. A main body comprises a containing space for containing an electronic component set. A first sensing unit is set outside the main body for sensing a pressure the main body located and obtaining a first pressure value. A pressure control module is set inside the containing space of the main body and electronically connected to the first sensing unit. The pressure control module comprises a second sensing unit, a processing unit and a pressurization unit. A second sensing unit senses the pressure of the containing space and obtains a second pressure value. A processing unit receives the first pressure value and the second pressure value, compares the relative deviation between the first pressure value and the second pressure value, and determines if the relative deviation between the first pressure value and the second pressure value is larger than a preset value, then provides a pressurization adjustment signal, a depressurization adjustment signal, a pressurization stop signal or a depressurization stop signal. When the second pressure value is smaller than the first pressure value and the deviation between the first pressure value and the second pressure value is larger than a preset value, the processing unit provides the pressurization adjustment signal to a pressurization unit. The pressurization unit receives the pressurization adjustment signal from the processing unit and releases a gas to the containing space until the second pressure value increases and the deviation between the first pressure value and the second pressure value is smaller than the preset value. The processing unit then provides a pressurization adjustment signal to the pressurization unit.

Additionally, the image capturing device with waterproofing in the present invention further comprises a depressurization unit which is disposed on the main body for reducing the pressure of the containing space. When the second pressure value is larger than the first pressure value and the deviation between these two pressure values is larger than a preset value, the processing unit provides a depressurization adjustment signal to the depressurization unit. Wherein the depressurization unit is electronically connected to the processing unit for receiving the depressurization adjustment signal and automatically dismantling gas inside the containing space until the second pressure value decreases and the deviation between the first pressure value and the second pressure value is smaller than a preset value. Besides, when the second pressure value decreases and the deviation between the first pressure value and the second pressure value is smaller than a preset value, the processing unit provides a depressurization stop signal to the depressurization unit immediately.

The image capturing device with waterproofing in the present invention can further comprises a gas inlet unit which is set on the main body to provide manual pressurization. Manual pressurization is completed by inputting gas manually into the containing space. Besides, the depressurization unit further provides manual depressurization, which is completed by opening the depressurization unit manually to dismantle gas inside the containing space.

The present invention of the image capturing device with waterproofing mentioned above has one or more advantages as the following:

(1) The image capturing device can provide manual or automatic pressure adjustment function which is more convenient.

(2) The image capturing device can let user manually input few gas into the containing space of the interior case in advance to increase pressure of the containing space beforehand. Or the depressurization device can be opened manually in advance to depressurize the containing space in advance to prevent the water from leaking inside because the pressure deviation between interior and exterior device is too large and have excessive impact on the sealing material of the image capturing device.

(3) The image capturing device can sense interior and exterior pressure automatically by the pressure sensing unit and the pressure control module, and automatically adjust interior pressure of the image capturing device by the pressurization unit and the depressurization unit. The automatic pressure adjustment makes the interior pressure adjustment of the image capturing device more flexible, and can prevent the problem that water leaks into inside of the device because the deviation between interior and exterior pressure is too large to cause the sealing material elastic fatigue.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
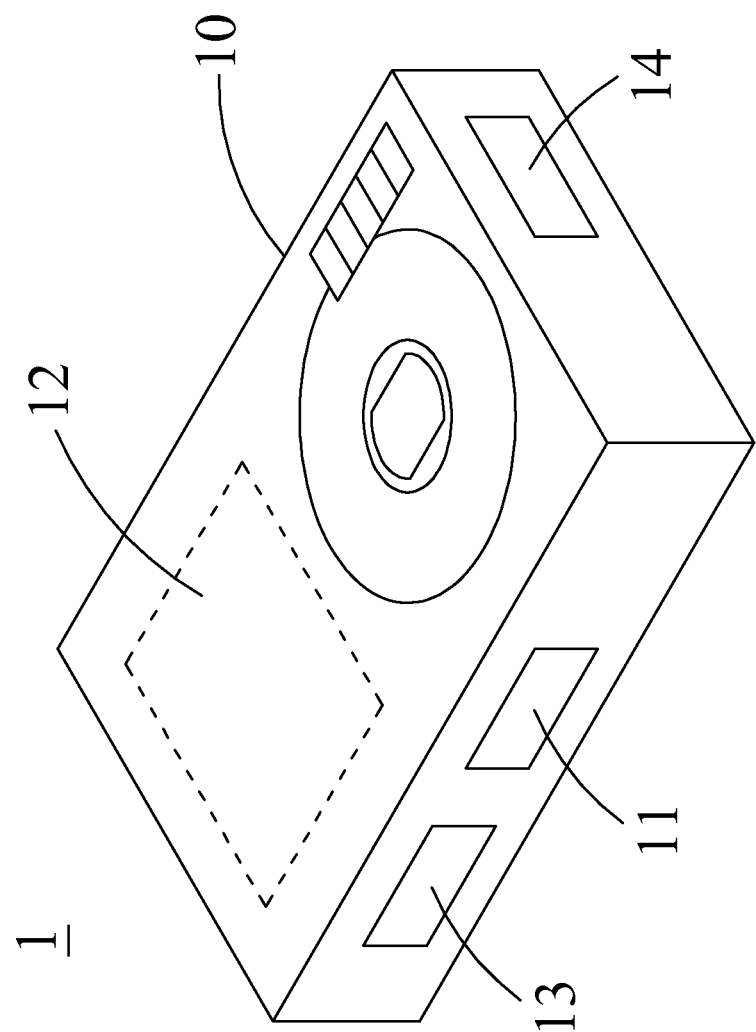
FIG. 1 is a structure diagram of an image capturing device with waterproofing according to an embodiment of the present invention.

The present invention will now be described with some preferred embodiments thereof and with reference to the accompanying drawings. For the purpose of being easy to understand, elements that are the same in the preferred embodiments are denoted by the same reference numerals.

The image capturing device in the present invention could be the digital camera, the camera phone, the Smartphone, digital video camera or any other portable electronic device with camera function. To further understand technical features of the present invention, the digital camera is used as the example but it is not limited to this case.

Please refer to FIG. 1 that is a structure diagram of an image capturing device with waterproofing according to an embodiment of the present invention. As shown, the image capturing device with waterproofing comprises a main body 10, a first sensing unit 11, a pressure control module 12, a depressurization unit 13 and a gas inlet unit 14. In addition, the main body 10 is an image capturing device, which is a digital camera in the embodiment of the present invention. As shown, the first sensing unit 11 is set outside the main body 10 to sense the pressure of the outside environment of the main body 10 to obtain a first pressure value. The first sensing unit 11 can be a pressure sensor, and the pressure sensor can use any kind of sensing method. The depressurization unit 13 is set on the main body 10 and connects interior and exterior space of the main body 10 to dismantle the pressure inside the main body 10. The depressurization unit 13 can be a depressurization gate. The gas inlet unit 14 is set on the main body 10 and connects interior and exterior of the main body 10. The gas inlet unit 14 can be an inlet hole, and the inlet hole is sealed when it is not used. The pressure control module 12 is set inside the main body 10 to sense the interior pressure of the main body 10 and obtain a second pressure value. Moreover, after receiving the first pressure value and the second pressure value, the pressure control module 12 makes a comparison and processes pressurization or depressurization of the main body 10 based on the compared results to increase or decrease the second pressure that the deviation between the first pressure value and the second pressure value becomes smaller than a preset value.

Figure 2:
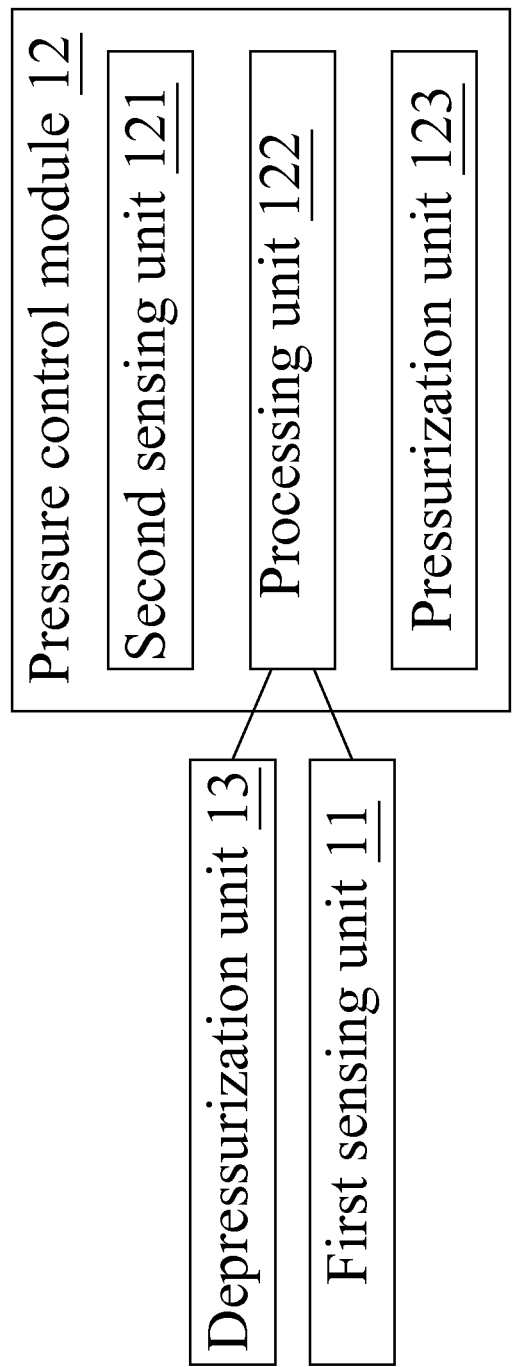
FIG. 2 is a schematic diagram of a pressure control module of the image capturing device with waterproofing according to an embodiment of the present invention.

Please also refer to FIG. 2 that is a schematic diagram of a pressure control module of the image capturing device with waterproofing according to an embodiment of the present invention. As shown, the pressure control module 12 comprises a second sensing unit 121, a processing unit 122 and a pressurization unit 123. As shown in the FIG. 2, the pressure control module 12 is electronically connected to the first sensing unit 11 and the depressurization unit 13. The second sensing unit 121 is a pressure sensor to sense the interior pressure of the main body 10 and obtain a second pressure value. The second sensing unit 121 can be a pressure sensor of any kind. The processing unit 122 receives the first pressure value and the second pressure value, compares the relative value of the first pressure value and the second pressure value, and then determines if the deviation between the first pressure value and the second pressure value is larger than a preset value. Moreover, the processing unit 122 provides a pressurization adjustment signal, a depressurization adjustment signal, a pressurization stop signal or a depressurization stop signal to the pressurization unit 123 or the depressurization 13 based on the compared results.

In addition, the setting of the preset deviation value between the first pressure value and the second pressure value can based on factors such as the pressure difference that the whole electronic device can stand or the property of the sealing materials. When the processing unit 122 determines the second pressure value is smaller than the first pressure value and the deviation between the first pressure value and the second pressure value is larger than the preset value, it transmits a pressurization adjustment signal to the pressurization unit 123 which pressurizes and releases gas into interior of the main body 10. The second sensing unit 121 continuously senses the pressure variation inside the main body 10 in this process until the releasing gas makes the second pressure value which is the pressure value inside the main body increase that the deviation between the first pressure value and the second pressure value is smaller than the preset value. Thus the processing unit 122 transmits a pressurization stop signal to the pressurization unit 123 immediately to stop the action of pressurization.

On the other hand, when the processing unit 122 determines that the second pressure value is larger than the first pressure value and the deviation between the first pressure value and the second pressure value is larger than the preset value, it transmits a depressurization adjustment signal to the depressurization unit 13 to depressurize and release gas from interior of the main body 10. The second sensing unit 121 also continuously senses the pressure variation inside the main body 10 in this process until the releasing gas makes the second pressure value which is the pressure value inside the main body decrease to have the deviation between the first pressure value and the second pressure value smaller than the preset value. Thus the processing unit 122 transmits a depressurization stop signal to the depressurization unit 13 immediately to stop the action of depressurization. Moreover, when the processing unit 122 determines the deviation between the second pressure value and the first pressure value is smaller than the preset value, it will not process any action of pressurization or depressurization.

Figure 3:
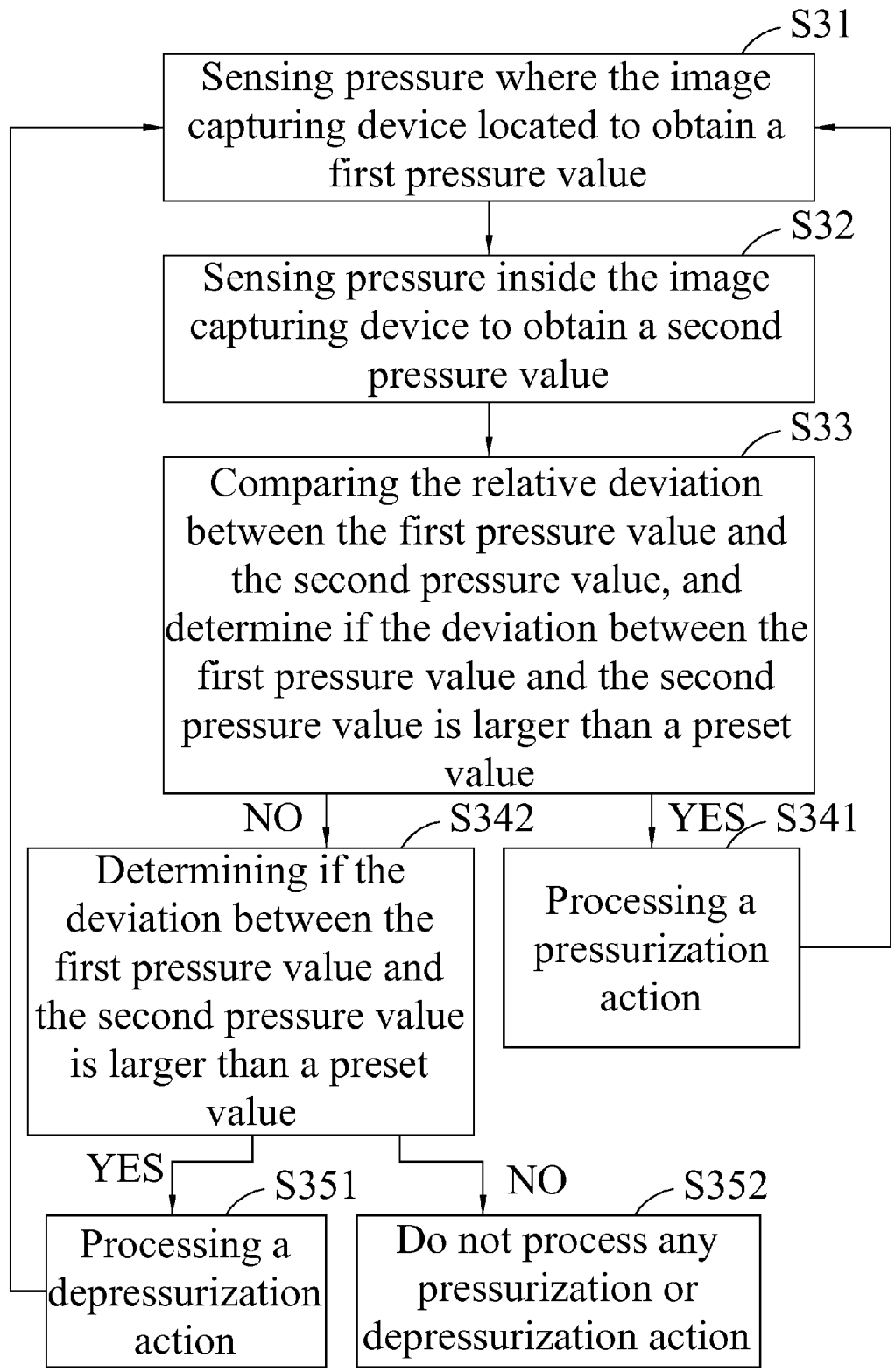
FIG. 3 is a flowchart of an automatic pressure control of the image capturing device with waterproofing according to an embodiment of the present invention.

Please also refer to FIG. 3 that is a flowchart of an automatic pressure control of the image capturing device with waterproofing according to an embodiment of the present invention. As shown, the FIG. 3 comprises the following steps: (S31) sensing pressure of where the image capturing device located to obtain a first pressure value; (S32) sensing pressure inside the image capturing device to obtain a second pressure value; (S33) comparing the relative magnitude between the first pressure value and the second pressure value, and determining if the deviation between the first pressure value and the second pressure value is larger than a preset value, going to step (S341) to process a pressurization action if the second pressure value is smaller than the first pressure value and the deviation between the first pressure value and the second pressure value is larger than a preset value; otherwise, continuing step (S342) to determine if the deviation between the first pressure value and the second pressure value is larger than a preset value, going to step (S351) to process a depressurization action if the deviation between the first pressure value and the second pressure value is larger than a preset value. However, after determining the deviation between the first pressure value and the second pressure value is smaller than a preset value, go to step (S352) not to process any pressurization or depressurization action.

In addition, when processing the action of pressurization or depressurization, system will continuously go back to step (S31) and determine whether if to stop pressurization or depressurization based on each step. In the process of pressurization or depressurization, when determining that the second pressure value decreases to have the deviation between the first pressure value and the second pressure value smaller than a preset value, or the second increases to have the deviation between the first pressure value and the second pressure value smaller than a preset value, the processing unit 122 transmits a depressurization stop signal immediately to the depressurization unit 13 or transmits a pressurization stop signal to the pressurization unit 123 to stop the action of pressurization or depressurization.

Figure 4:
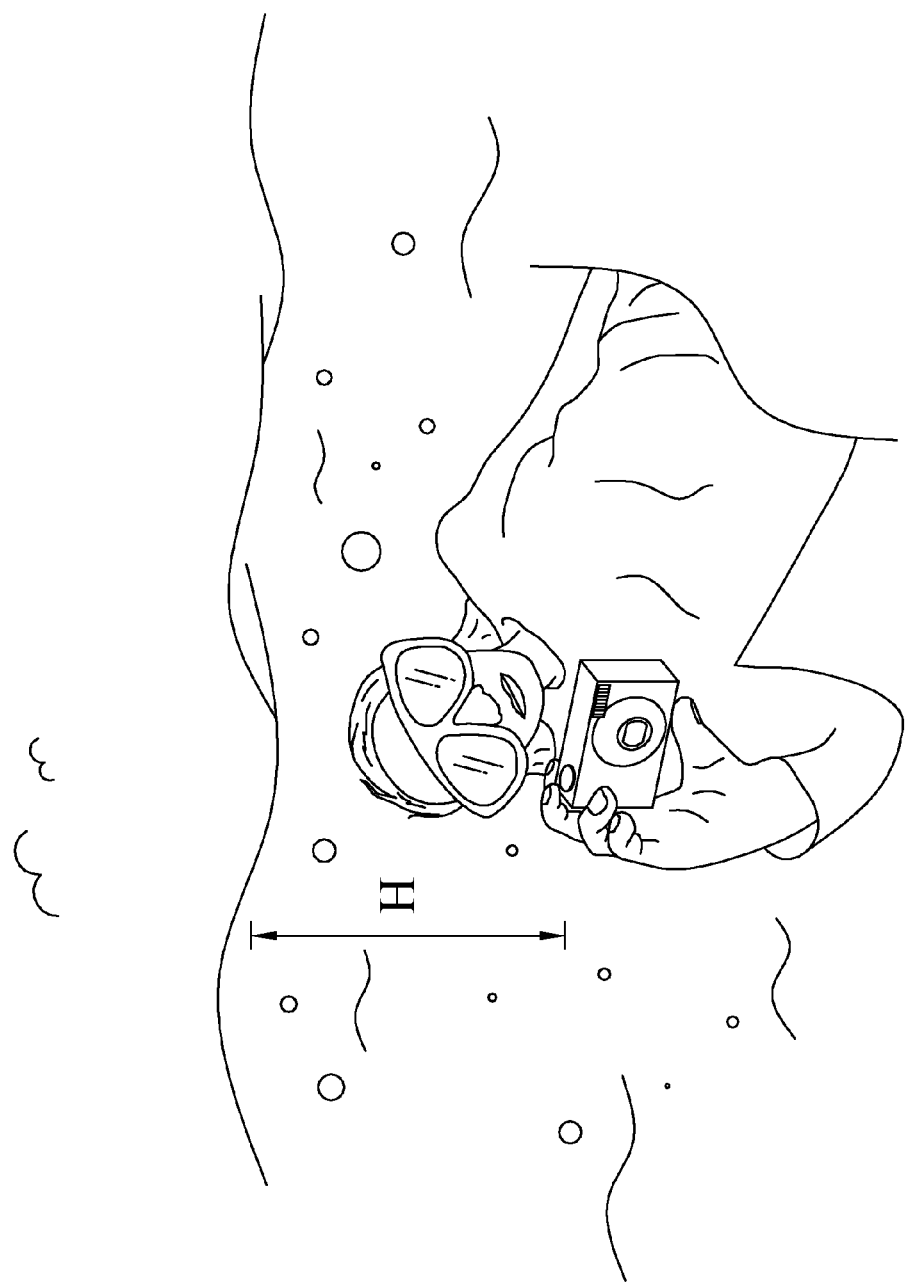
FIG. 4 is a schematic diagram of the using status of the image capturing device with waterproofing according to the embodiment of the present invention.

Please also refer to FIG. 4 that is a schematic diagram of the using status of the image capturing device with waterproofing according to the embodiment of the present invention. As shown, it is a schematic diagram showing that a user uses an image capturing device with waterproofing in the embodiment of the present invention when snorkeling. In this embodiment, when user takes the digital camera 1 to slowly dive from sea level to under sea level, the first sensing unit 11 and the second sensing unit 121 will keep sensing the interior and exterior pressure separately and analyze the relative relationship between the first pressure value and the second pressure value by a pressure control module 12.

Because the undertaking sea water pressure equals to the value that snorkeling depth (H) times the sea water density (D), when diving from the sea level, the exterior pressure sensed by the digital camera keeps increasing, and the sensed exterior pressure is the atmospheric pressure of the sea level adds the sea water pressure of snorkeling depth at that moment. Because the interior pressure of camera is kept the same as the atmospheric pressure, when the sensed water pressure that user sinks to a depth (H) exceeds a preset value, the pressure control module 12 located in the digital camera will transmit a pressurization adjustment signal to the pressurization unit 123. When pressurization, the user may keep sinking, therefore the pressurization will continue until the deviation between the exterior pressure at the final depth of user and the interior pressure of the digital camera is smaller than a preset value. That is, when user stops at a fixed sea depth, the interior pressure of the camera will stay in a second pressure value, the subtraction between the second pressure value and the first pressure value will be in the range of a positive and negative difference value that the digital camera could stand at the sea depth.

On the other hand, when user finishes snorkeling and takes the digital camera to rise from under the sea level to the sea level, the first sensing unit 11 and the second unit 121 will keep sensing the interior and exterior pressure separately and analyze the relative relationship between the first pressure value and the second pressure value by the control module 12.

Because the undertaking sea water pressure equals to the value that snorkeling depth (H) times the sea water density (D), the exterior pressure sensed by the digital camera decreases when sea water depth decreasing, and the sensed exterior pressure is the atmospheric pressure of the sea level adds the sea water pressure of snorkeling depth at that moment. When user from a specific snorkeling depth rising to the direction of sea level, the exterior pressure of the digital camera that is the first pressure value will decrease with the rising height. When the decreased pressure value makes the interior pressure of the digital camera which is the second pressure value larger than a preset value, the pressure control module 12 located in the digital camera will transmit a depressurization adjustment signal to the pressurization unit 13. When depressurization, user may keep rising, the depressurization will continue until the deviation between the exterior and interior pressure of the digital camera at the final depth of user is smaller than a preset value. That is, when user stops at a fixed sea depth, the interior pressure of the camera will stay in a second pressure value, the subtraction between the second pressure value and the first pressure value is in the range of a positive and negative difference value that the digital camera stays at the sea depth.

Figure 5:
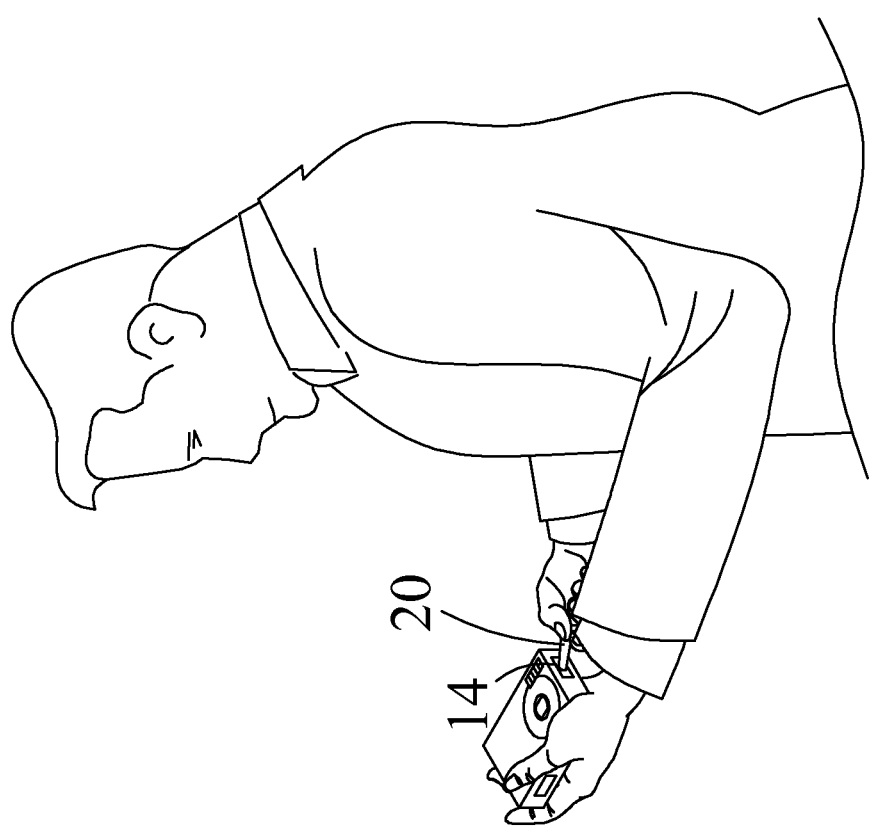
FIG. 5 is a schematic diagram of the manual pressurization of an image capturing device with waterproofing according to an embodiment of the present invention.

Besides, the image capturing device with waterproofing according to the embodiment of the present invention can automatically detect and analyze the deviation between the interior pressure and exterior pressure of the image capturing device by the first sensing unit 11, the pressure control module 12 and the depressurization unit 13 to process the action of pressurization and depressurization to the interior space of the image capturing device. Moreover, it can manually input gas into the interior space of the image capturing device by a gas inlet unit 14 located outside the image capturing device in advance. Please refer to FIG. 5 that is a schematic diagram of the manual pressurization of an image capturing device with waterproofing according to an embodiment of the present invention. As shown, user can input gas into the interior space in advance to pressurize the interior space manually by aligning a gas filling device 20 to a gas inlet unit 14 such as gas inlet hole before snorkeling. Otherwise, user can manually open the depressurization unit 13 such as depressurization gate to manually process depressurization.

In sum, the image capturing device with waterproofing according to the embodiment of the present invention can sense interior pressure and exterior pressure of the image capturing device automatically by the pressure sensing unit and the pressure control module. Moreover, the pressurization unit and the depressurization unit can adjust the interior pressure of the image capturing device automatically. The automatic adjustment makes the interior pressure adjustment of the image capturing device more flexible, and can prevent the problem of deviation between interior and exterior pressure is too large that the sealing material elastic fatigue that water leaking into inside of the device. Besides, the image capturing device can provide the manual pressure adjustment function to be more convenient.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. An image capturing device with waterproofing, comprising:
   a main body comprising a containing space for containing an electronic component set;
   a first sensing unit set outside the main body for sensing a pressure the main body located and obtaining a first pressure value; and
   a pressure control module set inside the containing space of the main body and electronically connected to the first sensing unit, comprising:
   a second sensing unit sensing the pressure of the containing space and obtaining a second pressure value;
   a processing unit receiving the first pressure value and the second pressure value, comparing relative deviation between the first pressure value and the second pressure value, and determining if deviation between the first pressure value and the second pressure value is larger than a preset value, then providing a pressurization adjustment signal, a depressurization adjustment signal, a pressurization stop signal or a depressurization stop signal; and
   a pressurization unit receiving the pressurization adjustment signal from the processing unit and releasing gas to the containing space according to the pressurization adjustment signal until the second pressure value increases to be equal to the first pressure value,
   wherein the processing unit provides the pressurization adjustment signal to the pressurization unit while the second pressure value becomes smaller than the first pressure value and the deviation between the first pressure value and the second pressure value is larger than the preset value, and the processing unit provides the pressurization stop signal to the pressurization unit while the second pressure value increases until the deviation between the first pressure value and the second pressure value becomes smaller than the preset value.

2. The image capturing device with waterproofing as recited in claim 1, wherein the portable device further comprises a depressurization unit which is disposed on the main body and connected interior and exterior of the main body for reducing the pressure of the containing space.

3. The image capturing device with waterproofing as recited in claim 2, wherein the second pressure value is larger than the first pressure value and the deviation between the first pressure value and the second pressure value is larger than the preset value, the processing unit provides the depressurization adjustment signal to the depressurization unit.

4. The image capturing device with waterproofing as recited in claim 3, wherein the depressurization unit is electronically connected to the processing unit for receiving the depressurization adjustment signal from the processing unit, and automatically dismantling the gas in the containing space until the second pressure value reduces to be equal to the first pressure value.

5. The image capturing device with waterproofing as recited in claim 4, wherein the second pressure value reduces until the deviation of the second pressure value and the first pressure value becomes smaller than the preset value, the processing unit provides the depressurization stop signal to the depressurization unit.

6. The image capturing device with waterproofing as recited in claim 2, wherein further comprising a gas inlet unit located on the main body and connecting interior and exterior space of the main body for providing a manual pressurization which is completed by injecting gas manually into the containing space.

7. The image capturing device with waterproofing as recited in claim 6, wherein the gas inlet unit comprises an inlet hole, which is sealed when it is not used.

8. The image capturing device with waterproofing as recited in claim 2, wherein the depressurization unit provides a manual depressurization which is completed by manually opening the depressurization unit for dismantling the gas inside the containing space.

9. The image capturing device with waterproofing as recited in claim 3, wherein the depressurization unit comprises a depressurization gate.

10. The image capturing device with waterproofing as recited in claim 1, wherein the pressurization unit comprises a small compressed gas steel bottle.

* * * * *